US008734748B1

(12) United States Patent
Hung et al.

(10) Patent No.: US 8,734,748 B1
(45) Date of Patent: May 27, 2014

(54) PURIFYING NANOMATERIALS

(75) Inventors: Ching-Cheh Hung, Westlake, OH (US); Janet Hurst, Columbia Station, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/892,278

(22) Filed: Sep. 28, 2010

(51) Int. Cl.
*C01B 21/064* (2006.01)
*C01B 35/02* (2006.01)
*C01B 35/00* (2006.01)

(52) U.S. Cl.
USPC ........... 423/290; 423/289; 423/276; 977/840; 977/846; 977/845

(58) Field of Classification Search
None
See application file for complete search history.

(56) References Cited

U.S. PATENT DOCUMENTS

| | | | | |
|---|---|---|---|---|
| 7,537,682 B2* | 5/2009 | Dailly et al. | ................. | 205/555 |
| 8,414,855 B2* | 4/2013 | Tang et al. | .................... | 423/290 |
| 8,617,503 B2* | 12/2013 | Yoshihara et al. | ............ | 423/290 |
| 2010/0074832 A1* | 3/2010 | Dailly et al. | ................ | 423/447.1 |
| 2011/0086965 A1* | 4/2011 | Zhi et al. | ........................ | 524/404 |
| 2011/0230122 A1* | 9/2011 | Le Godec et al. | ................ | 451/28 |
| 2012/0070357 A1* | 3/2012 | Prilutsky et al. | .............. | 423/290 |
| 2013/0011317 A1* | 1/2013 | Prilutsky et al. | .............. | 423/290 |

OTHER PUBLICATIONS

Chen et al.; Purification of boron Nitride Nanotubes; Chemical Physics Letters; 425, 315-319; 2006.*
Li et al.; The Removal of Encapsulated Catalyst Particles from Carbon Nanotubes Using Molten Salts; Carbon 44, 1699-1705; 2006.*
Shen, Ciping, Mayorga, Steven G., Biagioni, Richard, Piskoti, Charles, Ishigami, Masahiro, Zettl, Alexander, Bartlett, Neil; "Intercalation of Hexagonal Boron Nitride by Strong Oxidizers and Evidence for the metallic Nature of the Products", Journal of Solid State Chemistry 147, 74-81 (1999), Article ID jssc.199.8176.
Lin, Yi, Williams, Tiffany V., Connell, John W.; "Soluble, Exfoliated hexagonal Boron Nitride Nanosheets"; National Institute of Aerospace; J. Phys. Chem. Lett., 2010, 1 (1), pp. 277-283, Publication Date (Web): Nov. 30, 2009.

* cited by examiner

*Primary Examiner* — Guinever Gregorio
(74) *Attorney, Agent, or Firm* — Robert H. Earp, III (57) ABSTRACT

A method of purifying a nanomaterial and the resultant purified nanomaterial in which a salt, such as ferric chloride, at or near its liquid phase temperature, is used to penetrate and wet the internal surfaces of a nanomaterial to dissolve impurities that may be present, for example, from processes used in the manufacture of the nanomaterial.

13 Claims, 14 Drawing Sheets

PURIFYING NANOMATERIALS

ORIGIN OF THE INVENTION

The invention described herein was made by employees of the United States Government and may be manufactured and used by or for the Government for Government purposes without the payment of any royalties thereon or therefore.

BACKGROUND

Nanomaterials, such as boron nitride nanotubes (BNNT), have many potential applications in the field of electronics. However, synthesizing nanotubes with the necessary purity levels has been difficult because catalysts, such as iron, nickel and/or magnesium oxide reacted in atmospheres such as ammonia, produce undesired impurities. Before the resultant nanotubes can be effectively used, they must be purified. While most external impurities can be removed fairly easily by treating the raw product with an acid, insoluble impurities and the internal impurities are more tightly embedded and therefore, more difficult to reach without damaging the structure of the nanomaterial. Heating acid treated materials to oxidize metallic impurities and subsequently retreating in acid is known. Unfortunately, when the internal impurities oxidize, they expand causing stress and possible structural damage to the nanomaterials. Functionalization is also a known technique for removing impurities. The functionalized nanomaterial is placed in a solvent such that only the nanomaterial dissolves leaving behind the undissolved impurities. However, solvents that are completely effective are not always available. Sonification is another method used, in which ultrasonic vibration mechanically separates the impurities from the nanomaterials. This method has also been shown to cause damage to the structure of the nanomaterial.

BRIEF SUMMARY

The process described herein, produces a purified nanomaterial that can be effectively characterized and used, that may not alter or cause structural damage to the resultant materials. As used in the specification and claims, nanomaterials are structures designed at the molecular level (nanometer) having a principal chemical composition and other chemicals or impurities in less abundance. One such structure is a nanotube. By contrast, a powdered form of the principal chemical composition is not considered a nanomaterial. The purified nanomaterials, such as BNNT, may have a purity level on the order of commercial grade powders. Using metal salts, such as iron chloride, near or at its liquid phase temperature as a solvent to penetrate and wet the internal surfaces of the nanomaterials dissolves impurities, and allows the impurities to diffuse to the external surface to be washed away without causing intercalation or exfoliation.

The accompanying drawings, which are incorporated in and constitute a part of the specification, illustrate various example systems, methods, and so on that illustrates various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DESCRIPTION OF DRAWINGS

FIGS. 11 (*a*)-(*c*) are charts of experimental data.
FIGS. 12 (*a*)-(*c*) are charts of experimental data.
FIGS. 13 (*a*) and 13 (*b*) are charts of experimental data.

DETAILED DESCRIPTION

Nanomaterials, such as boron nitride nanotubes, may be synthesized by chemically combining excess reactants and catalysts. After the nanomaterials were prepared, it may be necessary to implement a purification process to remove any remaining impurities.

Boron nitride is very water resistant or resistant to anything that is water soluble. Using a salt, like $FeCl_3$ as a solvent is effective in dissolving remaining impurities, because it has a high wettability such that while in its liquid state, it is able to disperse over a surface as opposed to forming droplets or beading. As the $FeCl_3$ approaches its liquid state, its ability to spread out and take the shape of its container or substrate increases, allowing the salt to flow into the internal surfaces of the BNNT and dissolve remaining impurities. Pure $FeCl_3$ melts at 306° C. and boils at 315° C. For purposes of this disclosure a salt at its liquid or near-liquid state is deemed as being within 20% of its melting temperature. For example, $FeCl_3$ is at its liquid or near-liquid state when it is at a temperature between 245° C. and 367° C. At higher temperatures, as the $FeCl_3$ starts to decompose, chlorine gas may start to form. $FeCl_3$ completely decomposes to chlorine gas between 400°-410° C. Chlorine can combine with a number of chemicals to form either gas or water soluble chlorides, which can then be rinsed away. However, any salt capable of wetting the nanomaterial may be used, such as $AlCl_3$ and $CuCl_2$. In addition, this process is not limited to boron nitride nanomaterials and excess boron, metals such as iron and magnesium and phosphorus impurities, but can also be applied to other nanomaterials, such as carbon and silicon, and impurities such as cobalt and/or nickel.

Figure 1:
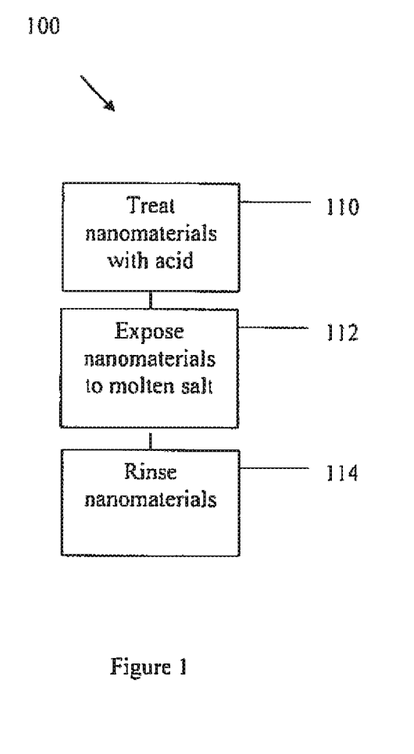
FIG. 1 is a flowchart showing a procedure for removing impurities from a nanomaterial.

One embodiment of a method, 100, of removing impurities from the nanomaterials is shown in FIG. 1. The nanomaterials are treated with an acid, step 110. They are then exposed to a metal salt near or at its liquid state, step 112, and rinsed, step 114. Alcohol, ethanol, ether, deionized water, carbon tetrachloride and many others, can be used to rinse the nanomaterials.

Figure 2:
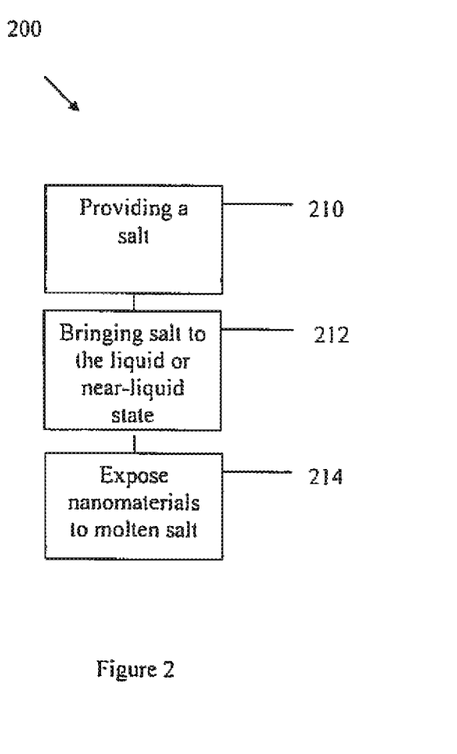
FIG. 2 is a flowchart showing a procedure for removing impurities from a nanomaterial.

Another embodiment of a method, 200, of removing impurities from the nanomaterials is shown in FIG. 2. A salt, such as $FeCl_3$, $AlCl_3$ or $CuCl_2$, and the like is acquired from or provided by any of several sources, step 210. The salt is heated to a temperature necessary to bring it to its liquid or near-liquid state, step 212. For example, $FeCl_3$ melts at 306° C. and a range of 250°-350° C. is suitable. The nanomaterial is then exposed to the liquid (or near-liquid) salt for a time sufficient to remove impurities from the nanomaterial, step 214.

Figure 3:
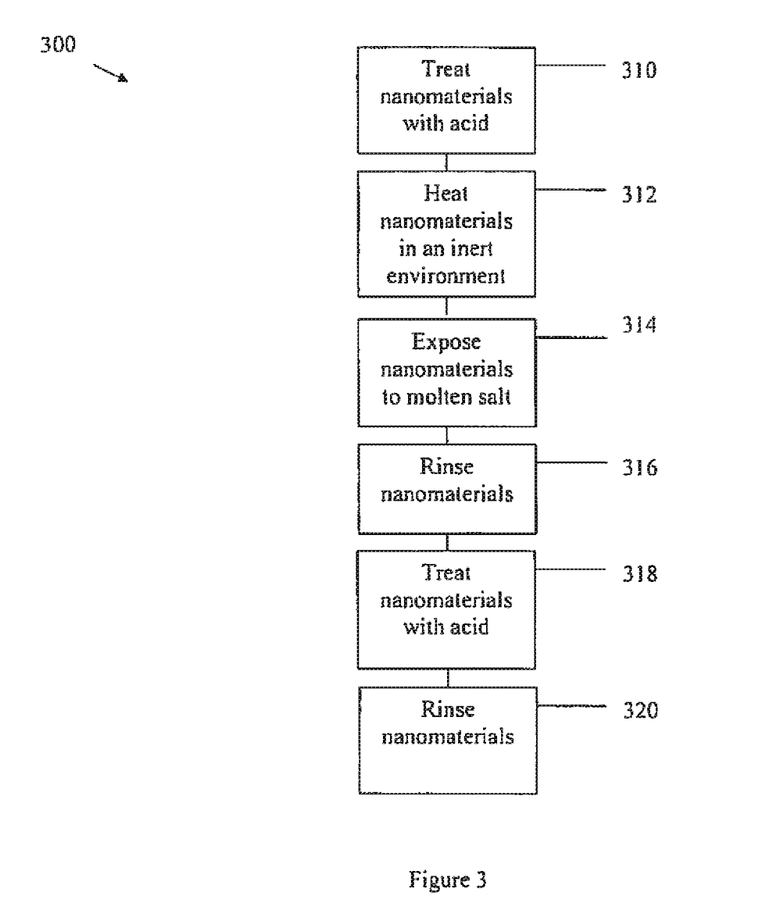
FIG. 3 is a flowchart showing a procedure for removing impurities from a nanomaterial.

Another embodiment of a method, 300, of removing impurities from the nanomaterials is shown in FIG. 3. The nanomaterials are treated with an acid, such as HCl, step 310. After several hours of treatment in an acid, the nanomaterials are heated for about 30 minutes in an inert environment, such as $N_2$ at 1150° C., step 312. The nanomaterials are exposed to a metal salt near or at its liquid state, such as $FeCl_3$ in the temperature range 250°-350° C., step 314 and then rinsed, step 316. The materials are treated again in acid, step 318, and rinsed, step 320.

Figure 4:
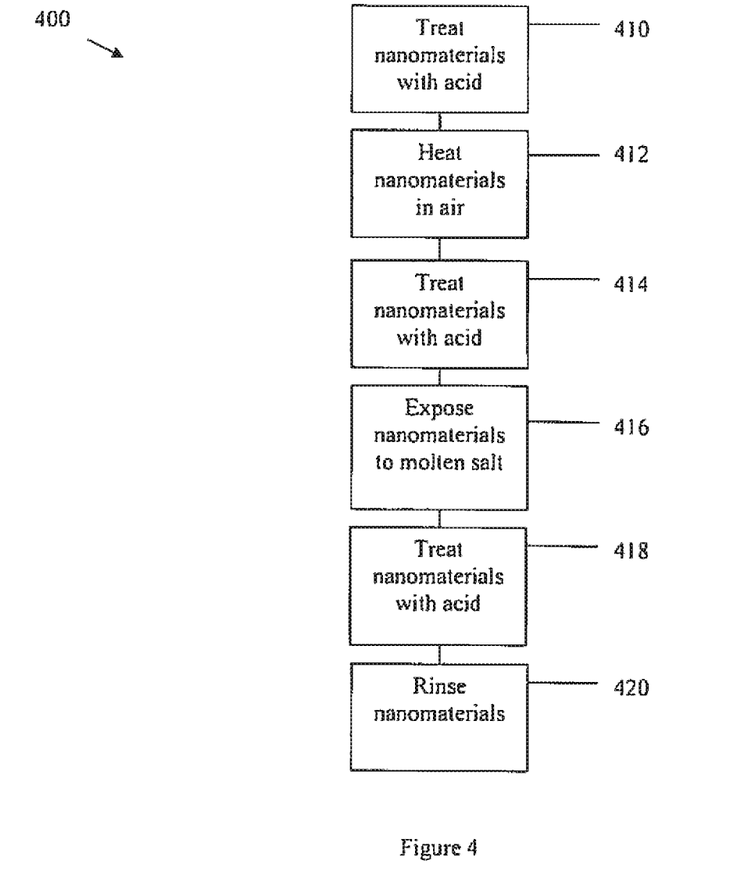
FIG. 4 is a flowchart showing a procedure for removing impurities from a nanomaterial.

Another embodiment of a method, 400, of removing impurities from the nanomaterials is shown in FIG. 4. The nanomaterials are treated with an acid, such as HCl, step 410, heated in air, step 412, and treated with an acid at room temperature, step 414. A metal salt, near or at its liquid state is used to treat the nanomaterials, step 416. The nanomaterial is treated again in acid at room temperature, step 418, and rinsed, step 420.

Figure 5:
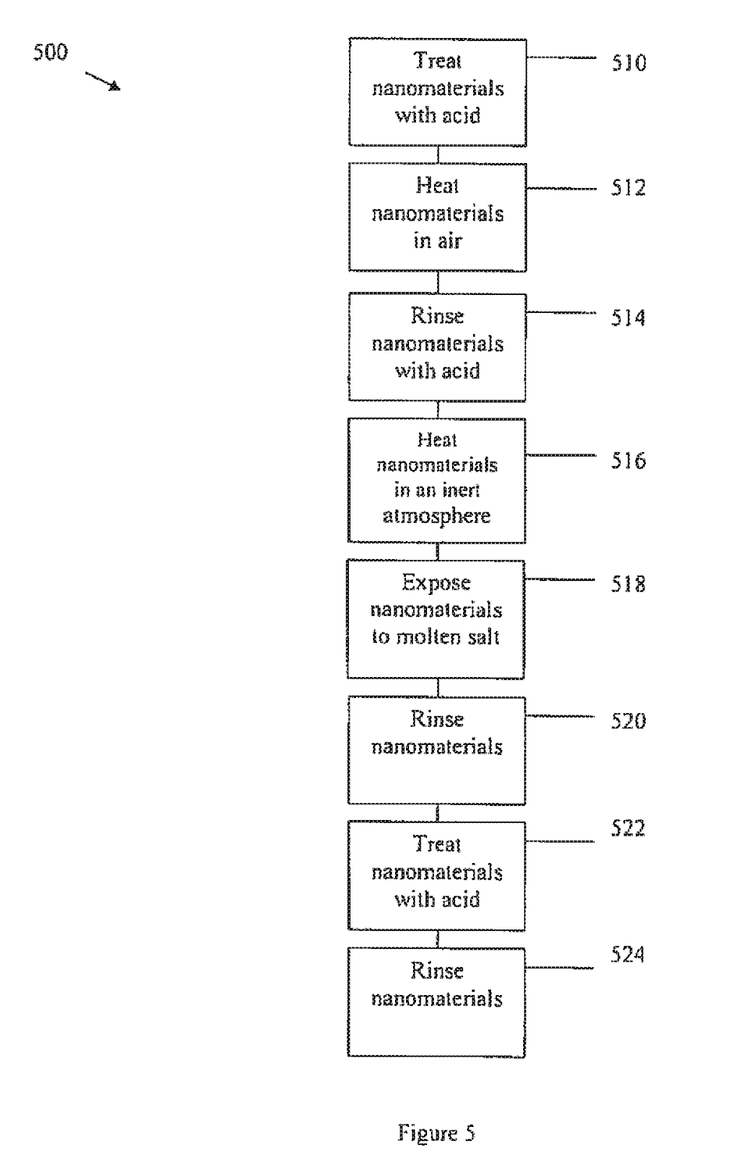
FIG. 5 is a flowchart showing a procedure for removing impurities from a nanomaterial.

Another embodiment of a method, 500, of removing impurities from nanotubes is shown in FIG. 5. A nanotube, such as boron nitride nanotubes (BNNT) is treated in HCl for 13.5 hours, step 510. The nanotubes may be heated in air at 700° C. for about 15 minutes, step 512. HCl or other suitable rinsing agent is used to rinse the nanotubes at room temperature for approximately 39.5 hours, step 514. By heating for about 30 minutes in an inert environment, such as $N_2$, at 1150° C., step 516, the nanotubes may be annealed. The nanotubes are exposed to a metal salt near or at its liquid state, such as $FeCl_3$ in the temperature range 250°-350° C. to remove impurities, step 518. After exposure, the nanotubes are rinsed with deionized water, step 520. They may be treated again in acid for about 3 hours at room temperature, step 522, and rinsed one more time, step 524. Artisans will appreciate that functionally equivalent substitutions of specific materials may be used.

Figure 6:
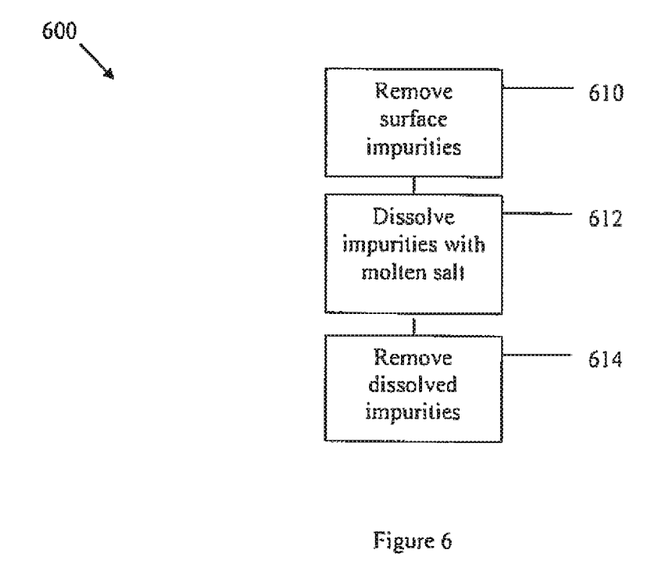
FIG. 6 is a flowchart showing a procedure for purifying nanomaterials.

Another embodiment of a method, 600, of purifying nanomaterials is shown in FIG. 6. Surface impurities may be removed from the newly made nanomaterials, step 610. Remaining impurities may be dissolved using a liquid salt, step 612. The dissolved impurities may be removed, step 614.

Figure 7:
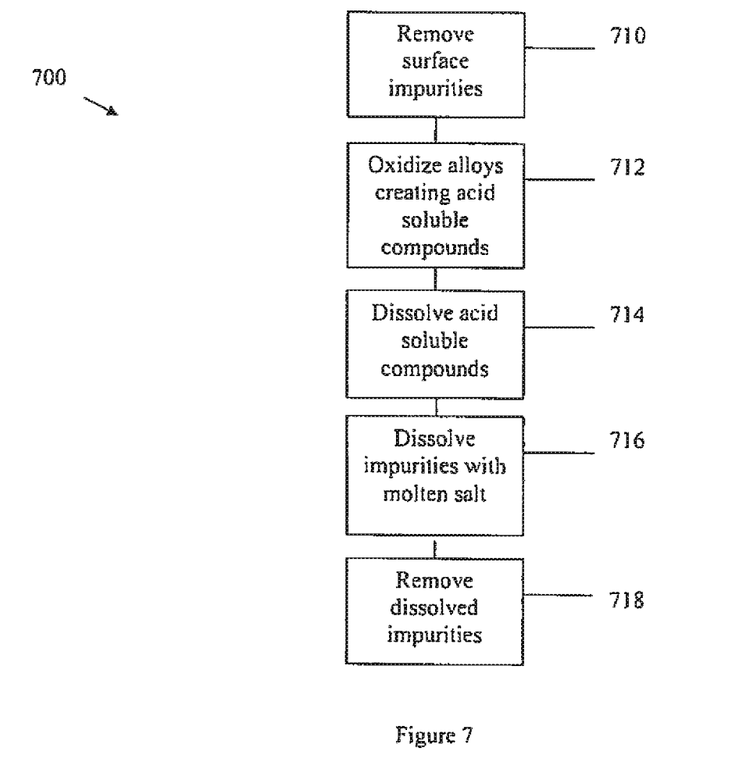
FIG. 7 is a flowchart showing a procedure for purifying nanomaterials.

An exemplary embodiment of a method, 700, of purifying nanomaterials is shown in FIG. 7. Surface impurities are removed from the nanomaterials, step 710. Some of the insoluble compounds present in the nanomaterial structure are oxidized forming acid soluble compounds, step 712. The acid soluble compounds are then dissolved in, for example, HCl, step 714. Remaining impurities are dissolved using a salt, such as $FeCl_3$ in the temperature range 250°-350° C., step 716. The dissolved impurities are then removed, step 718.

Figure 8:
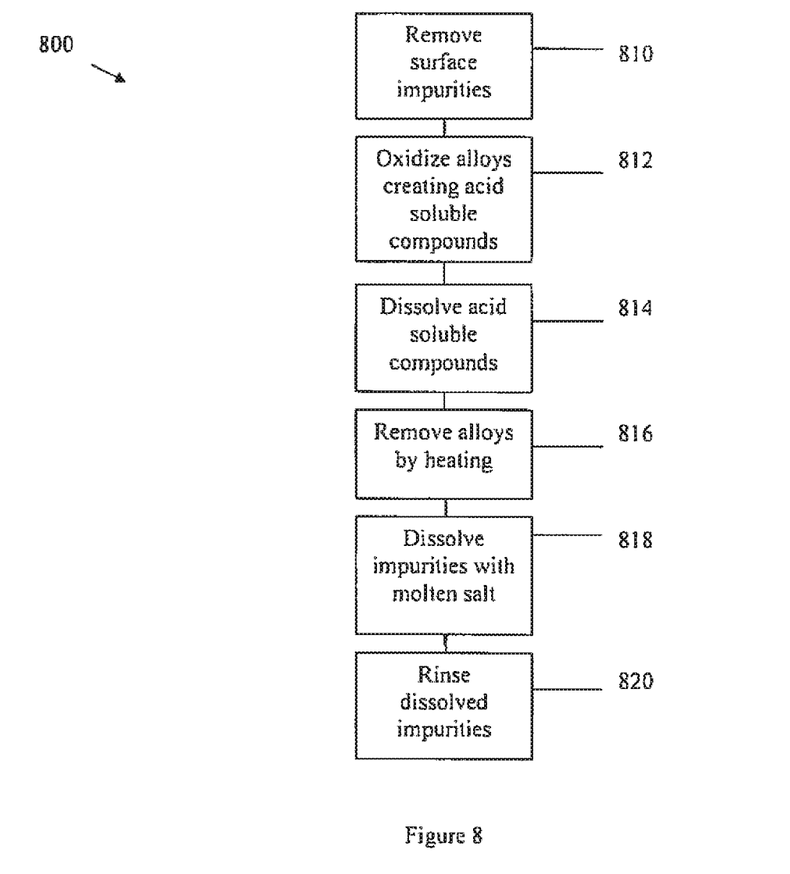
FIG. 8 is a flowchart showing a procedure for purifying nanomaterials.

Another embodiment of a method, 800, of purifying nanomaterials is shown in FIG. 8. Surface impurities may be removed from nanomaterials, such as boron nitride nanotubes, step 810. Undesirable insoluble compounds, such as Fe, Mg, B, and P, may be oxidized forming acid soluble compounds, step 812. The acid soluble compounds are then dissolved, step 814. To remove the impurities that are still insoluble, such as phosphorus, from the boron nitride structure, the nanotubes are annealed, by heating for about 30 minutes in an inert environment, such as $N_2$ at 1150° C., step 816. Remaining impurities may be dissolved using a liquid or near liquid salt, such as $FeCl_3$ in the temperature range 250°-350° C., step 818. The dissolved impurities may be removed by rinsing, step 820.

EXPERIMENTAL RESULTS

Figure 9:
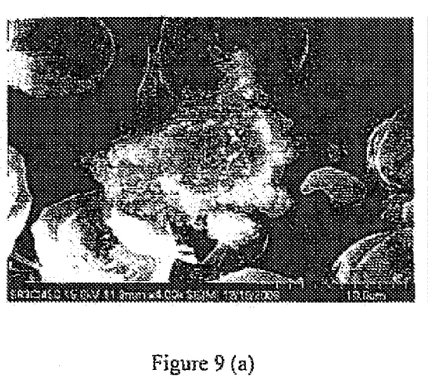
FIG. 9 shows SEM photographs.

FIG. 9(a) show scanning electron micrographs (SEM) of boron nitride nanomaterials after being exposed to $FeCl_3$ at its liquid or near-liquid state. FIG. 9(b) shows SEM of a nanomaterial after being exposed to $FeCl_3$ at a temperature above its boiling point. Both SEM micrographs indicate that the external surface of the nanomaterials is completely covered with impurities to the extent that the surface of the nanotubes could not be seen. It appears that after exposure to the $FeCl_3$ salt in both the liquid and/or vapor phase, the impurities diffused from the internal structure and remained on the outside surface after the ferric chloride was evaporated. Diffusion of impurities is believed possible as long as the liquid salt in contact with the internal surfaces has a higher concentration of dissolved impurities than the liquid salt in contact with the external surfaces. In one embodiment, the salt for purification is one that may wet, but not react with, the surfaces of the nanomaterial. The diffusion process allows the impurities to be removed without having to alter the material structure such as, by intercalation and exfoliation.

Figure 10:
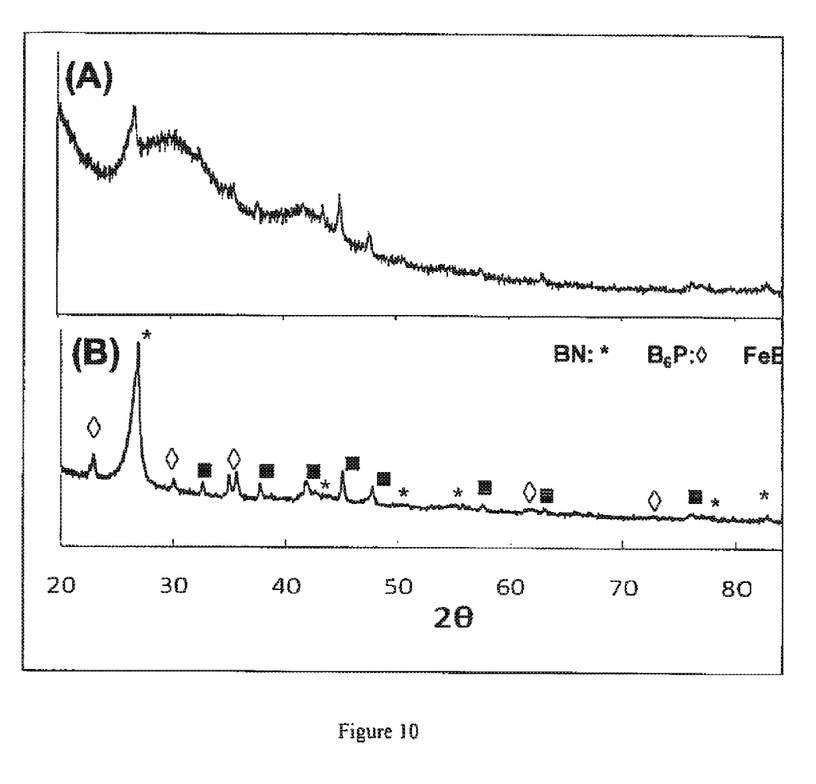
FIG. 10 is a chart of experimental data.

FIG. 10, shows two XRD scans indicated as curves A and B. Curve A, shows an XRD scan for a boron nitride nanomaterial that was exposed for a few hours to $FeCl_3$ from below its melting point to above the boiling point. While the data show the presence of boron nitride and some impurities, there is no sign that any intercalation occurred during the process, as is evidenced by the fact that the intensity of the boron nitride peak does not decrease after exposure to the $FeCl_3$ which would be expected if the structure started to break apart or expand. Curve B shows an XRD scan of the same sample described above after it was briefly rinsed with water and dilute HCl (less than 10 minutes total), and rescanned. The ratio of boron nitride to impurity peak height in curve B is higher than that in Curve A indicating that the impurities were partly removed. Longer and more methodical rinsing would remove more impurities.

Figure 11A:
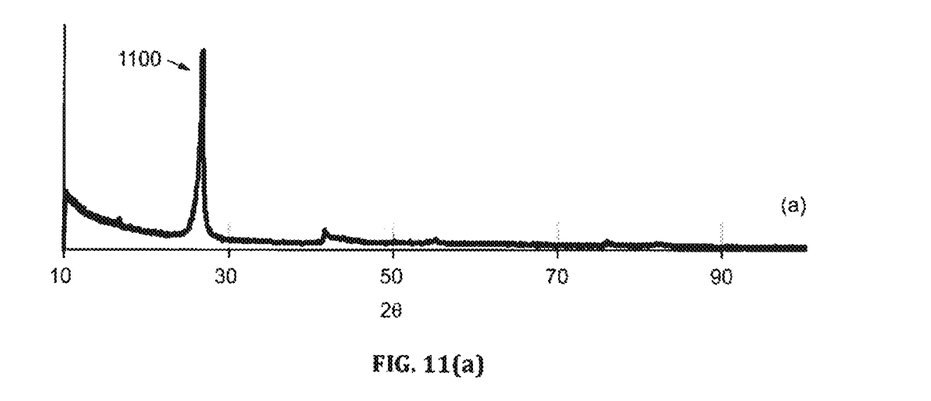
Figure 11B:
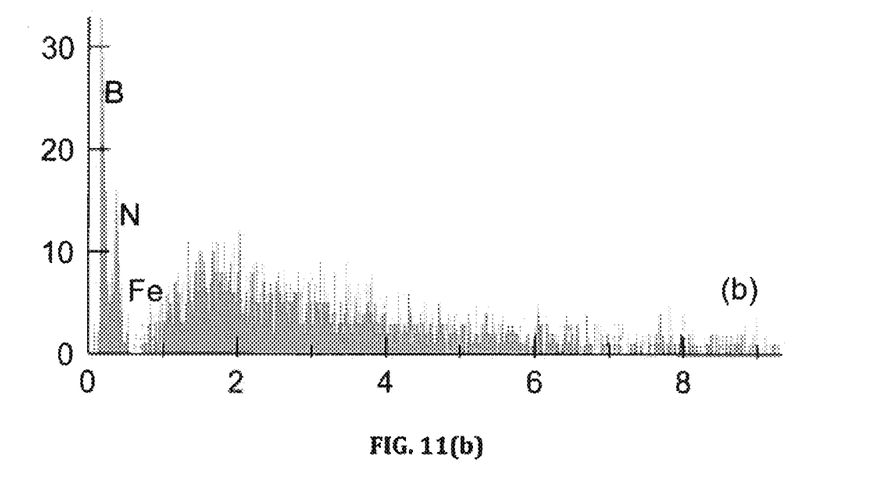
Figure 11C:
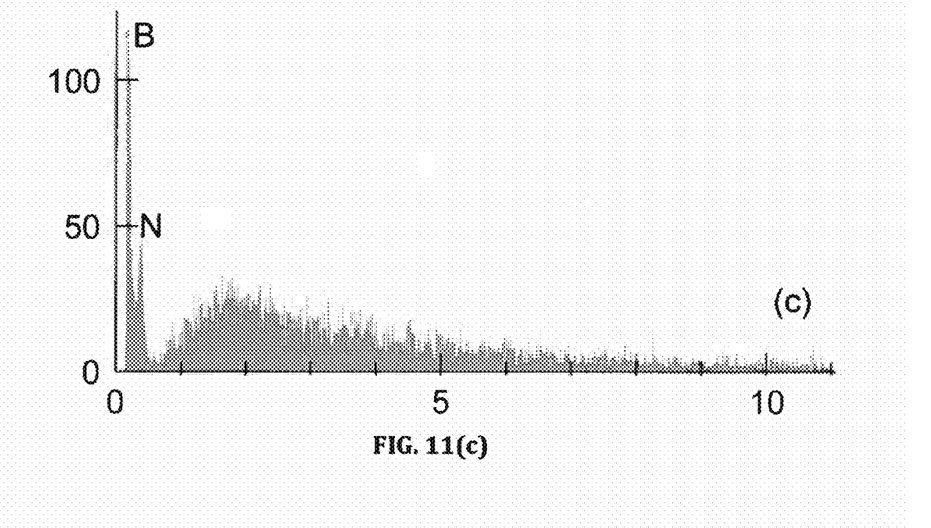

A representative x-ray diffraction (XRD) pattern is shown in FIG. 11(a). Within the detection limits of the X-ray diffractometer, the XRD scan indicates that the resultant BNNT, after the described purification process, is pure boron nitride because no other peaks exist beside the boron and nitrogen peak, 1100. In addition to XRD, energy dispersive spectrum (EDS) shown in FIGS. 11(b) and 11(c) both indicate a boron to nitride ratio close to 1:1. FIG. 11(b) shows exemplary boron nitride nanotubes after the purification process, and FIG. 11(c) shows an EDS of 99.5% pure commercial grade boron nitride powder for comparison.

Figure 12A:
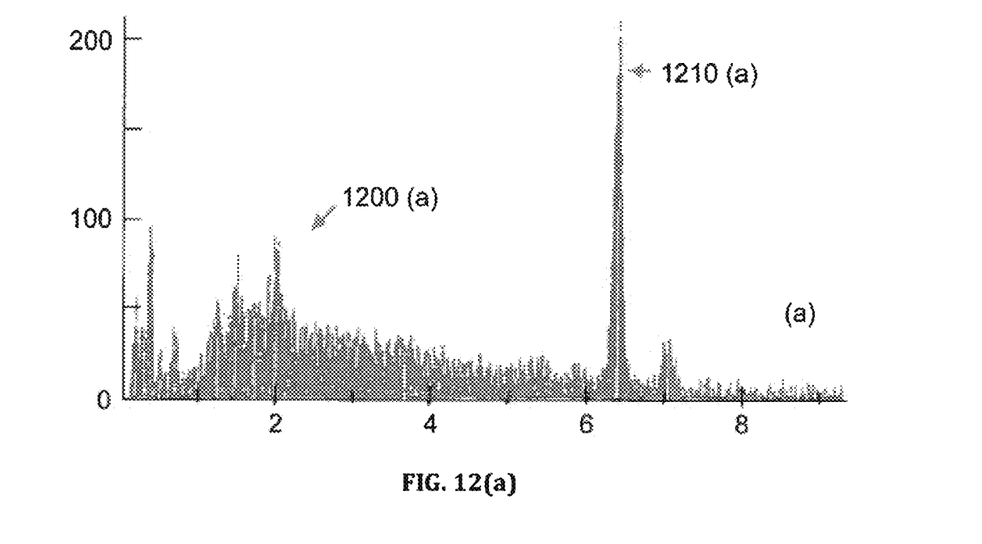
Figure 12B:
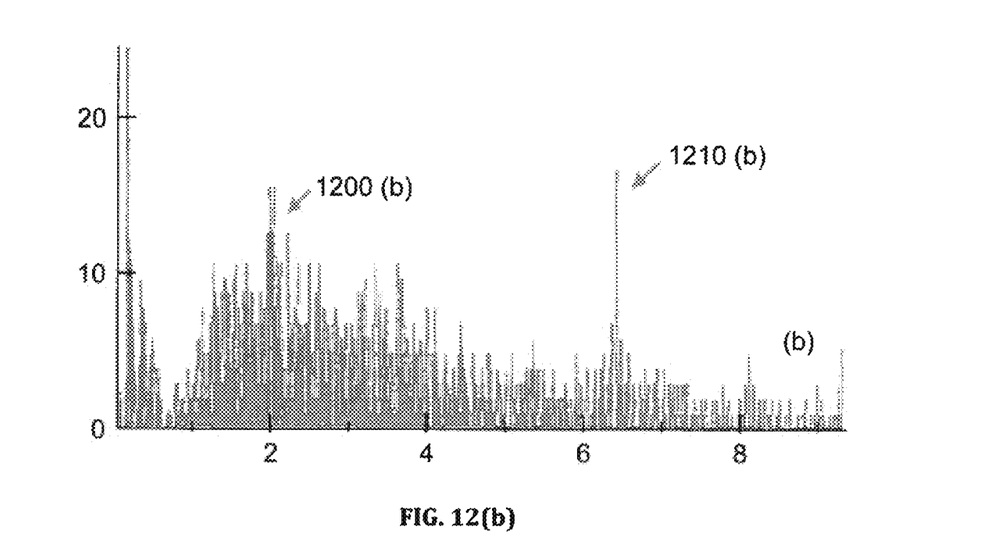
Figure 12C:
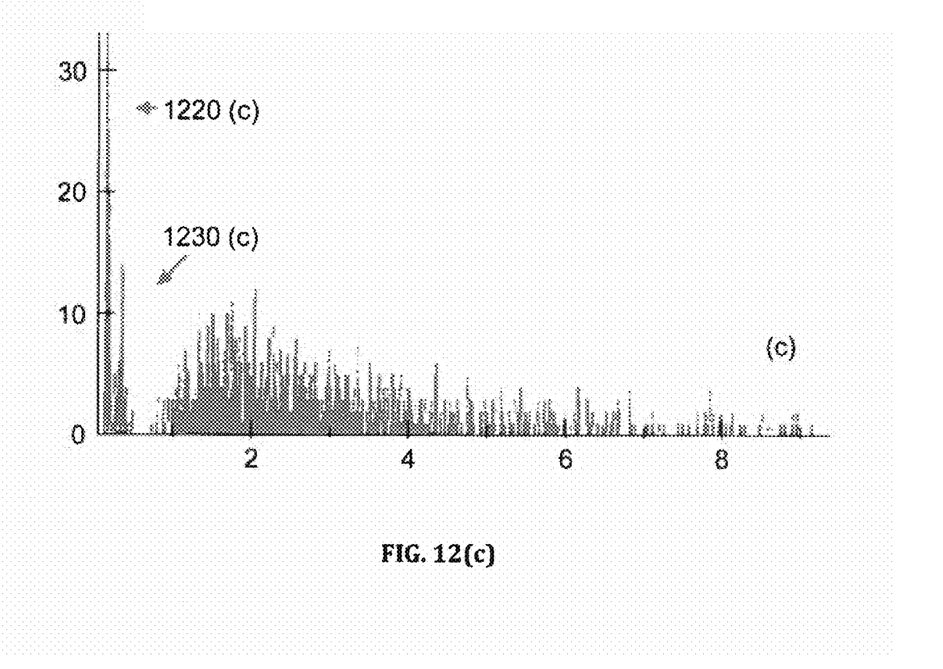

Additional EDS data are shown in FIGS. 12(a), 12(b) and 12(c) illustrating a sequential example of a purification process. FIG. 12(a) shows an EDS spectrum of an untreated, synthesized boron nitride nanotube (BNNT) containing, as expected, impurities including the catalysts and excess reactants used during the synthesis reactions. For example, the peaks at 2.0, 1200(a) and 6.3, 1210(a), indicate the presence of phosphorus and iron impurities respectively.

The BNNT was treated with hydrochloric acid (HCl) at 60° C. for 13.5 hours to remove impurities external to the BNNT. The treated BNNT was then treated in air at 700° C. for 0.25 hours to effectively oxidize insoluble impurities including iron (Fe), magnesium (Mg), boron (B) and phosphorous (P) to a mostly acid-soluble state. The BNNT was next disposed in room temperature HCl for 39.5 hours to dissolve the oxidized compounds. The BNNT was then annealed in an inert environment of nitrogen at 1150° C. for 0.5 hours to drive phosphorous out of the boron nitride structure. FIG. 12(b) shows an EDS spectrum of the sample following the treatment above. While it is noted that the y-axis scale is changed, the presence of impurities remains evident at the peaks at 2.0, 1200(b) and 6.3, 1210(b).

The BNNT was subsequently treated with 310° C. ferric chloride ($FeCl_3$) for 13 hours. The BNNT was then rinsed with deionized water, treated with room temperature HCl for 3 hours and rinsed again with deionized water to wash away the dissolved materials. It is appreciated that other rinsing materials can be substituted, for example, alcohol, ether and other organic chemicals that can wet ferric chloride as long as the rinsing mechanism is capable of removing dissolved impurities from the nanomaterial. FIG. 12(c) shows an EDS spectrum of the sample following the treatment. It is noted that the spikes indicating impurities are significantly reduced and the primary remaining spikes at the far left for both boron and nitrogen at 0.4, 1220(c) and 0.5, 1230(c) are greater than any other spikes and the nitrogen spike is 15-20% greater than the next highest spike. Either condition illustrates a purified BNNT.

Figure 13A:
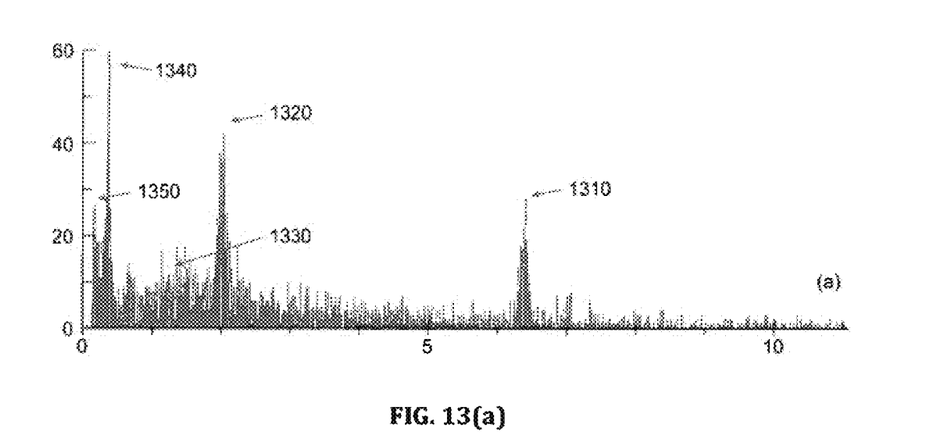
Figure 13B:
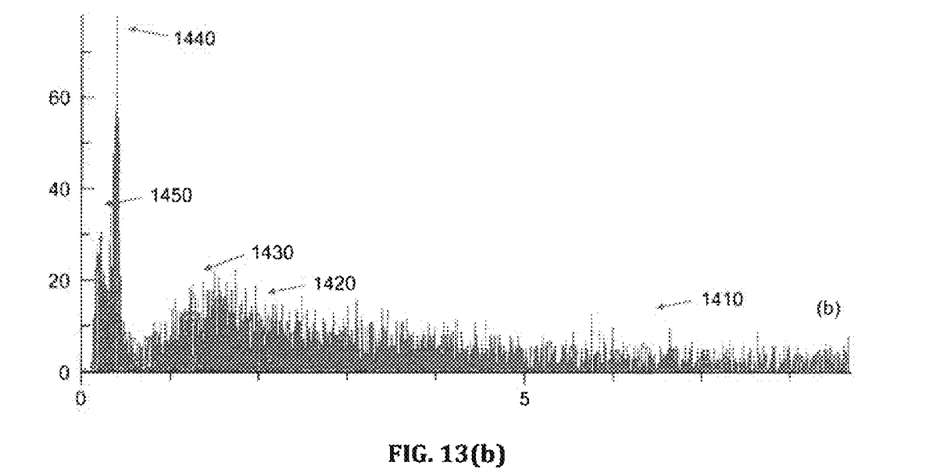

A purified BNNT was measured for impurity concentrations. Referring now to FIG. 13(a), after HCl treatment, the partially purified BNNT contained phosphorus, peak 2, 1320, between 2-3% by weight, iron, peak 6.3, 1310, 6-13% by weight, magnesium, peak 1.2, 1330, 1-2% by weight and total metal (iron and magnesium) 7-15% by weight as determined by the scanning electron microscope (SEM) energy dispersive spectroscopy (EDS) operating at 15 kV. Additional purification included dissolving impurities with $FeCl_3$ in the temperature range 300-400° C. for 16 hours. Room temperature HCl was used for a few hours to remove dissolved impurities. After which, impurities in the purified BNNT were barely detectable by SEM EDS operated at 15 kV. Referring now to FIG. 13 (b), the EDS calculated 0.1% by weight phosphorus, peak 2, 1420. The magnesium concentration is 0.2% by weight, shown at peak 1.2, 1430, the iron concentration is 0.5% by weight, peak 6.3, 1410, and total metal is 0.7% by weight as is evidenced by the significant decrease in height of peaks 1410 and 1420, as compared to peaks 1310 and 1320, respectively. As seen, the peaks 0.4, 1440, representing nitrogen, and boron, 0.2, 1450, are the predominate features of the graph.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Similarly, when the applicants intend to indicate "one and only one" of A, B, or C, the applicants will employ the phrase "one and only one". Thus, use of the term "or" herein is the inclusive, and not the exclusive use. See, Bryan A. Garner, A Dictionary of Modern Legal Usage 624 (2d. Ed. 1995).

The invention claimed is:

1. A method of removing impurities from a boron nitride nanomaterial comprising: providing a salt; bringing the salt to a liquid or near-liquid state; and exposing the boron nitride nanomaterial to the liquid or near-liquid salt for a time sufficient to remove impurities from the nanomaterial, where the bringing the salt to a liquid or near-liquid state comprises heating the ferric chloride to a temperature between 250° and 350° C.

2. The method as set forth in claim 1, where the nanomaterial comprises nanotubes.

3. The method of claim 1 wherein the product of claim 1 is rinsed in water.

4. The method as set forth in claim 1, further comprising pre-treating the nanomaterial with an acid.

5. The method as set forth in claim 1, further comprising rinsing the nanomaterial.

6. The method as set forth in claim 1, where the impurities comprise iron and phosphorous.

7. A method of purifying a boron nitride nanomaterial comprising: removing external impurities from the boron nitride nanomaterial with a first acid; oxidizing insoluble impurities associated with the boron nitride nanomaterial creating acid soluble compounds; dissolving the acid soluble compound in a second acid; driving impurities that are still insoluble out of the boron nitride nanomaterial structure by heating the boron nitride nanomaterial in an inert atmosphere; dissolving internal boron nitride nanomaterial impurities with a salt; and rinsing the dissolved internal impurities from the boron nitride nanomaterial, where the dissolving internal nanomaterial impurities with a salt comprises: bringing ferric chloride to a temperature between 250° and 350° C.; and treating the nanomaterial with the ferric chloride.

8. The method as set forth in claim 7, where the first acid and second acid are the same acid.

9. The method as set forth in claim 7, where an impurity comprises boron.

10. The method as set forth in claim 7, where an impurity comprises nickel.

11. The method as set forth in claim 7, where an impurity comprises cobalt.

12. The method as set forth in claim 7, where the rinsing comprises rinsing the nanomaterial with one of water, alcohol and ether.

13. The method as set forth in claim 7, where the nanomaterial comprises nanotubes.

* * * * *